(12) United States Patent
Höfflinger et al.

(10) Patent No.: US 7,430,005 B2
(45) Date of Patent: Sep. 30, 2008

(54) CAMERA MODULE AND METHOD FOR ELECTRONICALLY RECORDING IMAGES

(75) Inventors: Bernd Höfflinger, Sindelfingen (DE); Hans-Georg Kober, Gechingen (DE)

(73) Assignee: Institut fur Mikroelektronik Stuttgart (DE)

( * ) Notice: Subject to any disclaimer, the term of this patent is extended or adjusted under 35 U.S.C. 154(b) by 597 days.

(21) Appl. No.: 10/670,436

(22) Filed: Sep. 25, 2003

(65) Prior Publication Data
US 2004/0135912 A1 Jul. 15, 2004

(30) Foreign Application Priority Data
Sep. 30, 2002 (DE) ................. 102 46 368

(51) Int. Cl.
*H04N 3/14* (2006.01)
*H04N 5/335* (2006.01)
*H04N 5/217* (2006.01)
*H04N 5/16* (2006.01)

(52) U.S. Cl. ............... 348/308; 348/241; 348/258; 348/294; 348/302

(58) Field of Classification Search ................ 348/309, 348/310, 258, 374, 371; 250/214 L; 358/475, 358/509
See application file for complete search history.

(56) References Cited

U.S. PATENT DOCUMENTS

| | | | |
|---|---|---|---|
| 3,925,657 A | 12/1975 | Levine | 250/211 |
| 4,359,759 A | 11/1982 | McBride et al. | 358/111 |
| 4,755,875 A * | 7/1988 | Fremont | 348/258 |
| 4,758,894 A * | 7/1988 | Harada et al. | 348/313 |
| 5,124,547 A * | 6/1992 | Melman | 250/226 |
| 5,608,204 A | 3/1997 | Höfflinger et al. | 250/208.1 |
| 5,701,015 A * | 12/1997 | Lungershausen et al. | 250/495.1 |
| 5,956,163 A * | 9/1999 | Clarke et al. | 358/509 |
| 6,240,252 B1 * | 5/2001 | Yamaguchi et al. | 396/61 |
| 6,323,479 B1 | 11/2001 | Hynecek et al. | 250/214 L |

(Continued)

FOREIGN PATENT DOCUMENTS

EP 0 414 109 A2 2/1991

(Continued)

OTHER PUBLICATIONS

Loose et al., "A Self-Calibrating Single-Chip CMOS Camera with Logarithmic Response", IEEE Journal of Solid-State Circuits, vol. 36, No. 4, Apr. 2001, pp. 586-587.*

(Continued)

*Primary Examiner*—David Ometz
*Assistant Examiner*—Wanda M Negron
(74) *Attorney, Agent, or Firm*—St. Onge Steward Johnston & Reens LLC

(57) ABSTRACT

A camera module for electronically recording images has an image sensor with a plurality of image cells. Each image cell provides an electric image signal as a function of the intensity of incident light. Each image cell has a light-sensitive element for generating a light-dependent current, as well as at least one MOS transistor which is arranged in series therewith. The gate of the MOS transistor is at a fixed potential, and the source-drain path is flowed through by the light-dependent current. In accordance with one aspect of the invention, there is arranged at least one light source in the region of the image sensor by means of which the image cells can be illuminated.

18 Claims, 4 Drawing Sheets

U.S. PATENT DOCUMENTS 6,355,965 B1 * 3/2002 He et al. ............... 257/431
6,741,286 B2 * 5/2004 Meek et al. ............ 348/370

FOREIGN PATENT DOCUMENTS

| EP | 0 525 987 A1 | 2/1993 |
| EP | 0 632 930 B1 | 7/1998 |
| EP | 0 935 880 B1 | 2/2002 |
| WO | WO 91/18470 | 11/1991 |

OTHER PUBLICATIONS

Marshall and Collins, "A High Dynamic Range Front End for Automatic Image Processing Applications", SPIE vol. 3410, May 1998, pp. 176-184.*

Datasheet for Hitachi part No. HE8812 (GaAlAs Infrared emitting diode).*

* cited by examiner

CAMERA MODULE AND METHOD FOR ELECTRONICALLY RECORDING IMAGES

CROSS-REFERENCES TO RELATED APPLICATIONS

This application claims convention priority from German patent application DE 102 46 368.9, filed on Sep. 30, 2002.

BACKGROUND OF THE INVENTION

The present invention relates to a camera module for electronically recording images, and particularly to a module having an image sensor with a plurality of image cells, with each image cell providing an electric image signal as a function of the intensity of incident light, each image cell having a light-sensitive element for generating a light-dependent current and at least one MOS transistor arranged in series therewith, a gate of the transistor being at a fixed potential and a source-drain path of the transistor being flowed through by the light-dependent current.

The invention further relates to a method for electronically recording images by means of an image sensor having a plurality of image cells, the method comprising the following steps:
generating a light-dependent current by means of a light-sensitive element in each of the image cells,
generating an electric image signal in each of the image cells by means of an MOS transistor which is arranged in series with the light-sensitive element and whose gate is at a fixed potential and whose source-drain path is flowed through by the light-dependent current, and
reading out the electric image signals of all the image cells.

Image sensors for electronic recording of images have already found commercial application for some years in so-called digital cameras. The image sensors have a plurality of image cells which are arranged relative to one another in an array like fashion and which are frequently called pixels. The individual image cells generate an analogue electric image signal as a function of the intensity of incident light, which analogue image signal is subsequently converted into a digital image signal by means of an analogue-to-digital converter. The digital image signal is subsequently available for further processing and/or for outputting on a monitor, a printer or the like.

EP 0 632 930 B1 discloses an image cell for an image sensor which is characterized, in particular, by its wide-ranging logarithmic dependence between the intensity of incident light and the magnitude of the analogue image signals generated. This known image sensor thereby permits contrasting recording of image scenes with extremely strong brightness differences. In other words, the known image sensor has a very wide dynamic range. This characteristic is mainly achieved by a particular connection of the light-sensitive element which is coupled to an MOS transistor such that the photocurrent generated by the light-sensitive element flows through the source-drain path of the MOS transistor. The gate of the MOS transistor is shorted to the drain electrode of the MOS transistor, and this leads to the advantageous logarithmic dependence.

However, the known image cell has disadvantages under specific operating conditions. In particular, the transient response of the image cell is relatively slow in the case of a quick change from a light signal of high intensity to a light signal of low intensity (i.e. from bright to dark). As a consequence, when a bright moving object is being recorded against a dark background, so-called pulling effects occur which in the case of a fast image sequence are visible in the form of a light effect similar to a comet's tail. In fact, however, there is actually no comet's tail present in the image scene.

EP 0 935 880 B1 discloses a circuit arrangement by means of which this pulling effect can be suppressed. According to this reference, the image cell known from EP 0 632 930 B1 is supplemented by a further MOS transistor, which is arranged in parallel with the MOS transistor already mentioned before. A sort of reset voltage pulse can be applied via the further MOS transistor, and this can be used for quickly reducing excess charges in the region of the light-sensitive element. These excess charges are the consequence of the fast changing between bright and dark in the image scene.

SUMMARY OF THE INVENTION

It is an object of the present invention to provide an alternative way by means of which the described pulling effects can be reduced in an image sensor having image cells of the type mentioned at the beginning.

It is another object to provide a camera module wherein pulling effects are efficiently suppressed in an easy and cost effective manner.

It is yet another object to provide a possibility to easily retrofit existing camera modules such that pulling effects are efficiently suppressed.

According to one aspect of the invention, these and other objects are achieved by a camera module having an image sensor of the type mentioned at the beginning, wherein a light source is arranged in the region of the image sensor by means of which light source the image cells can be illuminated.

According to another aspect, a method of the type mentioned at the beginning is provided, wherein the light-sensitive elements of the image cells are illuminated by means of a light source arranged in the region of the image cells.

The use of light sources in the form of flash units, floodlights and the like is sufficiently known in the recording of images. However, such light sources always serve the purpose of lighting up and/or illuminating the image scene to be recorded by the camera. In contrast, it is now that the image cells of the image sensor are illuminated, i.e. the image cells are more or less directly irradiated by the light source. This does not rule out guiding the light of the light source to the image cells via (internal) mirrors, prisms or other optical elements. However, it is characteristic that the light source is used not to illuminate the image scene being viewed, but to illuminate specifically the image cells of the image sensor without illuminating the image scene.

An additional photocurrent is generated in the image cells by the specific illumination of the image cells with a light source appropriately aligned. In technical terms, the image cells can be optically biased to a modified operating point by the specific illumination. It has emerged that during the transient response to new illumination conditions the time constant of the image cells is a function of the position of the operating point, and thus of the level of the existing photocurrent. The higher the photocurrent, the faster the image cells react to variations. Surprisingly, it is therefore possible to shorten the reaction time during the transient response after a change from bright to dark by feeding additional light.

In other words, the further MOS transistor known from EP 0 935 880 B1, which operates as a type of reset switch, can be replaced (or supplemented, if appropriate) by a specific illumination of the image cells by means of an external light source. The (external) light source serves virtually as an optical reset switch. In particular, the specific illumination of the image cells after an abrupt change from bright to dark can be exploited to shorten the time constant for reducing the electric charges present in the light-sensitive elements, as a result of which the above-described pulling effects are effectively suppressed.

Moreover, the solution proposed here has the advantage that a plurality of image cells can be discharged simultaneously by means of a single light source, and so, by contrast with the solution proposed in EP 0 935 880 B1, there is no need to implement a separate reset function for each image cell. Moreover, the solution proposed here can also be retro-fitted in already existing, older camera modules, since there is no need to intervene in the physical layout of the image cells.

In accordance with a preferred exemplary embodiment, the light source outputs a radiation in the invisible spectral region, preferably in the infrared region, and with particular preference in the region about a wavelength of 880 nanometres.

Undesired side effects and possible interference owing to the additional light source can thereby be reduced more easily. The radiation of the additional light source can easily be separated by appropriate filters from radiation in the visible spectral region to be recorded. Moreover, a user of the novel camera module is not disturbed or unnerved by the light from the additional light source itself when the additional light source is not completely sealed off from the outside.

In accordance with a further preferred exemplary embodiment, the light source is integrated in a stationary fashion in the camera module.

Owing to this refinement, a compact assembly is created which permits the novel camera module to be more easily handled. Moreover, the light source can thereby be positioned and aligned exactly and permanently when producing the camera module so as to achieve optimum results. Undesired side effects and possible interference from the light source can be established and removed at an early stage.

In a further refinement, the light source surrounds the image sensor in the shape of a ring.

This refinement yields a particularly homogeneous illumination of the image sensor with its plurality of image cells without the light source hindering the actual image recording. In accordance with a particularly preferred embodiment, the light source includes, for example, an annular optical conductor which is fed with light at two diametrically opposite points, and then emits the said light annularly around the image sensor. Depending on the application, the light source can, however, also surround the image sensor rectangularly and/or also only in part, such as in the form of a partial ring.

In a further refinement, the image sensor and the light source are arranged on a common assembly carrier, in particular a common printed circuit board.

This refinement is particularly advantageous when the light source is implemented in the form of light-emitting diodes using the technology of SMDs (surface mounted devices). The alignment of the light source with reference to the image sensor can thereby be realized very robustly and, on the other hand, in a space-saving fashion. Moreover, the alignment of the light source with reference to the image sensor is independent in this refinement of the camera optics used, and this permits a very wide scope of application.

In a further refinement, the camera module includes a timing element which activates the light source as a function of the image signals for a fixed time period.

This refinement is technically a particularly simple way for realizing the reset function, described at the beginning, by means of the additional light source. It is particularly preferred that the timing element activates the light source for a fixed period of time whenever a specific, predefined brightness value is exceeded. The reset function is thereby already activated in advance of a change from bright to dark which is to be expected.

In a further refinement, the camera module has a control device which controls the light source such that the image signals of the individual image cells represent a mean light intensity which is higher as without the light source by a factor of approximately 5 to 200, preferably by a factor of approximately 10 to 100.

It has turned out from practical tests that increasing the mean light intensity in the orders of magnitude mentioned above yields particularly good results. Good results can particularly be achieved with the specified values, when the light intensity without additional illumination is in the region of the dark-current limit of the individual image cells. The light source can be appropriately driven in a control loop, for example, by evaluating the read-out image signals by means of a grey-scale value histogram, as is explained in more detail further below.

In accordance with a further exemplary embodiment of the invention, the electric image signals of the image cells are read out first time intervals separated from one another, and the light-sensitive elements of the image cells are illuminated in second time intervals separated from one another, the first and second time intervals being different from one another. This can be realized by means of an appropriately designed control device.

Consequently, the additional illumination of the image cells is performed only when no image information is being read out. The recorded images are therefore largely uninfluenced by the additional light source, and this contributes to a further improvement in the image quality. In particularly preferred exemplary embodiments, the image signals are read out row by row, and the illumination of the image cells is performed during a change of line and/or during a change of image. In another exemplary embodiment, the image rate, i.e. the frequency with which the image signals are read out, is halved, and the time gained is used to illuminate the image cells suitably.

In accordance with a further refinement, the light-sensitive elements are illuminated only when an existing basic brightness exceeds a first threshold value.

In this refinement, the image cells are illuminated by means of the additional light source only when a certain basic brightness is present. The basic brightness is the precondition for a change from bright to dark, in which the pulling effects emerge particularly strikingly. The additional light source is optimized precisely for this application by the above measure. On the other hand, this measure retains the sensitivity of the image cells to darkness.

In a further refinement, the light-sensitive elements are illuminated only when the image signals from consecutively read-out first time intervals differ by more than a (second) threshold value.

It is possible for this measure, as well, to completely suppress the pulling effects without disturbances or undesired side effects owing to the additional illumination.

It goes without saying that the previously mentioned features, and those still to be explained below, can be used not only in the respectively specified combination, but also in other combinations or on their own, without departing from the scope of the present invention.

BRIEF DESCRIPTION OF THE DRAWINGS

Exemplary embodiments of the invention are illustrated in the drawing and will be explained in more detail in the following description. In the drawing.

DETAILED DESCRIPTION OF PREFERRED EMBODIMENTS

Figure 1:
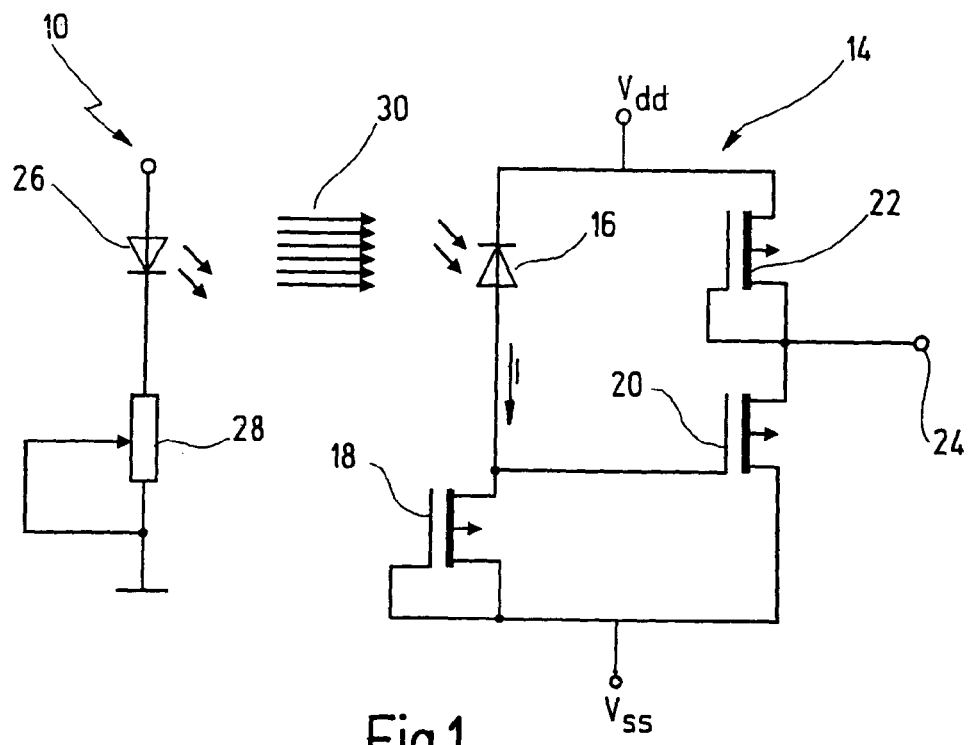
FIG. 1 shows a simplified electric circuit diagram of an image cell with an additional light source.
Figure 2:
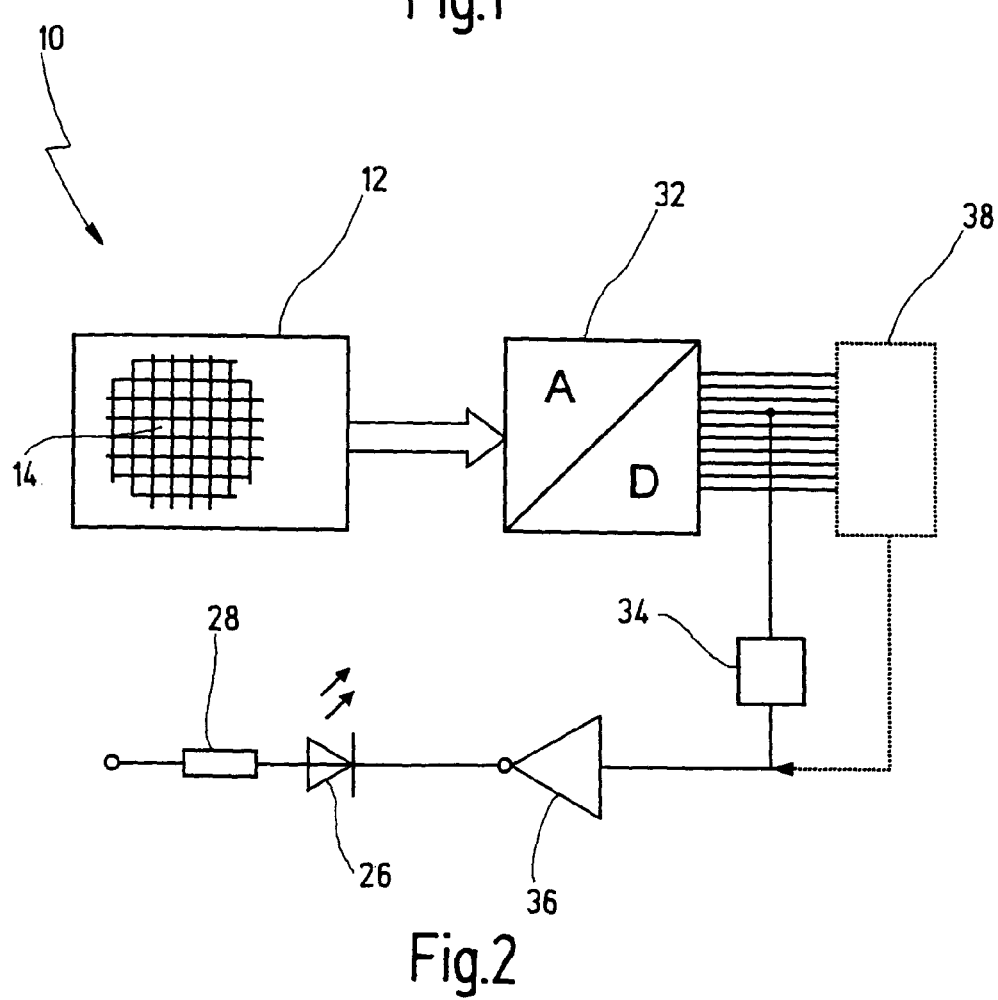
FIG. 2 shows a simplified block diagram for explaining the mode of operation of the novel camera module.

A camera module according to the invention is denoted in its entirety in FIGS. 1 and 2 by reference numeral 10.

The camera module 10 includes an image sensor 12 (FIG. 2) having a plurality of individual image cells 14 which are arranged in an array like fashion next to one another. A simplified electric circuit diagram of an individual image cell is illustrated in FIG. 1 as a representative for all the image cells 14.

The image cell 14 includes a light-sensitive element 16 which is illustrated here as a photodiode, as usual. In accordance with a preferred exemplary embodiment, the light-sensitive element 16 is implemented as a part of the first MOS transistor 18, or integrated in the latter, as is described in detail in EP 0 632 930 B1. In a modification therefrom, the light-sensitive element 16 can, however, also be implemented separately from the first MOS transistor 18 within the scope of the present invention. Neither is it limited to being implemented as a photodiode.

The light-sensitive element 16 and the first MOS transistor 18 are arranged relative to one another such that the photocurrent I generated by the light-sensitive element 16 flows via the source-drain path of the MOS transistor 18. Consequently, the anode of the light-sensitive element 16 and the MOS transistor 18 are arranged here in series with one another. The gate terminal of the MOS transistor 18 is short-circuited with the drain terminal and is at a fixed potential $V_{SS}$. Owing to this particular interconnection, a very exact logarithmic dependence is achieved between the intensity of the incident light and the magnitude of the image signals generated by the image cell 14.

Denoted by the reference numerals 20 and 22 are a second and a third MOS transistor which are likewise part of the image cell 14. The second MOS transistor 20 is connected as source follower to the first MOS transistor 18. Consequently, the gate terminal of the second MOS transistor 20 is connected to the source terminal of the first MOS transistor 18. Furthermore, the drain terminal of the second MOS transistor 20 is connected to the drain terminal of the first MOS transistor 18.

The third MOS transistor 22 is connected in series with the second MOS transistor 20, the drain terminal of the third MOS transistor 22 being connected to the source terminal of the second MOS transistor 20. The gate terminal of the third MOS transistor 22 is connected to the drain terminal thereof, and consequently to the source terminal of the second MOS transistor 20. Located at this node is the output 24 of the image cell 14, at which an analogue image signal can be tapped. The source terminal of the third MOS transistor 22 is at the same potential as the cathode of the light-sensitive element 16.

Reference numeral 26 denotes a light source which is preferably implemented in the form of a light-emitting diode. The light source 26 is connected in series with an adjustable resistor 28 (potentiometer) by means of which the brightness of the light source 26 can be set. Here, the reference numeral 30 denotes symbolically the radiation with which the light source 26 illuminates the light-sensitive element 16. In accordance with a particular exemplary embodiment, this is a radiation in the infrared region with a wavelength of 880 nanometres, i.e. the light-emitting diode is an IR light-emitting diode, for example of type SFH484.

As is shown in FIG. 2, the image sensor 12 is connected to an A/D converter 32 which converts the analogue image signals of the image cells 14 into digital image signals having a width of 10 bits in this case. There are thus $2^{10}=1024$ different image signal values available at the output of the A/D converter.

Moreover, there are provided in accordance with a first exemplary embodiment a timing element 34 and an amplifier 36 by means of which the light source 26 is driven. The timing element 34 is connected here to one of the output terminals of the A/D converter 32, for example to that terminal at which bit No. 7 of the 10-bit output signal is present. If this bit assumes the value 1, the timing element 34 is activated and, consequently, the light source 26 is activated via the amplifier 36 for a predefined period of time. In other words, the image sensor 12 is always illuminated whenever bit No. 7 assumes the value 1, and this corresponds to a specific basic brightness.

In accordance with a further exemplary embodiment, the camera module 10 has a control device 38 as an alternative or a supplement to the timing element 34, to which control device the digital image signals are fed. The basic brightness picked up by the image sensor 12 can be ascertained by means of the control unit 38, which is implemented as a digital signal processor, for example. The light source 26 can then be driven in a variable fashion as a function thereof. In particular, in a preferred exemplary embodiment the control unit 38 is designed such that the image signals of the individual image cells 14 represent a mean light intensity which, upon illumination by means of the light source 26, is higher by a factor of approximately 5 to 200 than without illumination, preferably by a factor of approximately 10 to 100. This can be realized, for example, by means of a histogram evaluation, something which is explained below by means of FIG. 5.

Figure 3:
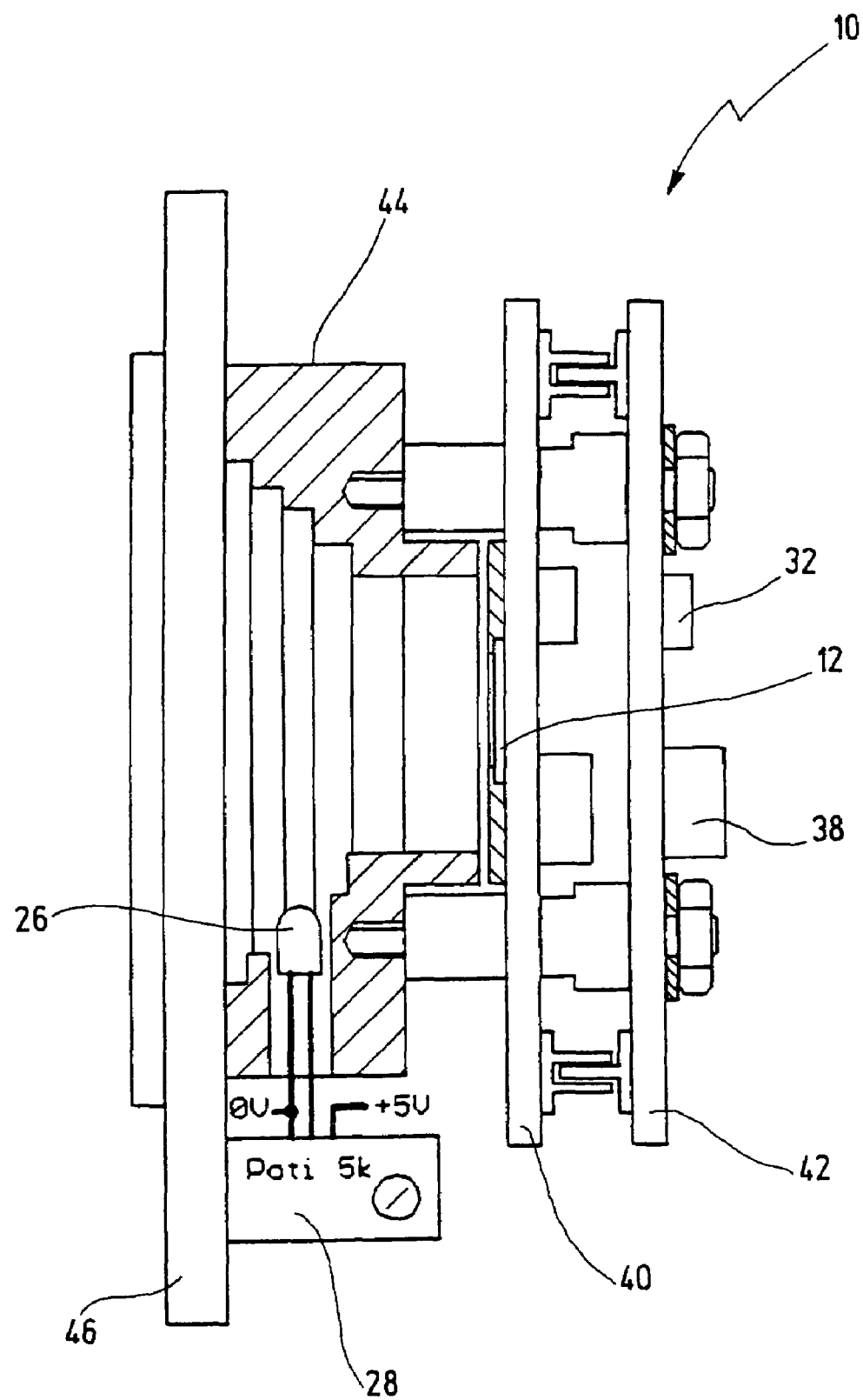
FIG. 3 shows a partially sectioned, schematic illustration of a novel camera module in a cross-sectional view.

However, FIG. 3 may be used prior to this to describe a preferred mechanical design of the novel camera module 10. Identical reference symbols denote the same elements in this case as previously.

In the camera module 10, the image sensor 12 is arranged together with some further electronic components on a first printed circuit board 40. The further electronic components include, for example, a circuit, known per se, for correcting the so-called fixed pattern noise (FPN correction). Reference numeral 42 denotes a further printed circuit board, which is fastened parallel to the first printed circuit board 40 and at a distance from the latter. Located on the further printed circuit board 42 are, inter alia, the A/D converter 32 and, in one exemplary embodiment, the control device 38. Here, reference numeral 44 denotes an objective tube 44, illustrated only diagrammatically, in a partially sectioned illustration. The image sensor 12 picks up incident light through the objective tube 44. The objective tube 44 has an outer body 46 on which there are arranged the light source 26, the resistor 28 and a suitable power supply for the light source 26. The light source 26 in the form of a light-emitting diode projects laterally into the objective tube 44. In this arrangement, the light source 26 is located laterally and, seen in the direction of view of the image sensor 12, a little upstream of the image sensor 12. This arrangement enables the light source 26 to illuminate the image cells 14 of the image sensor 12 without disturbing the recording of an image scene.

Figure 4:
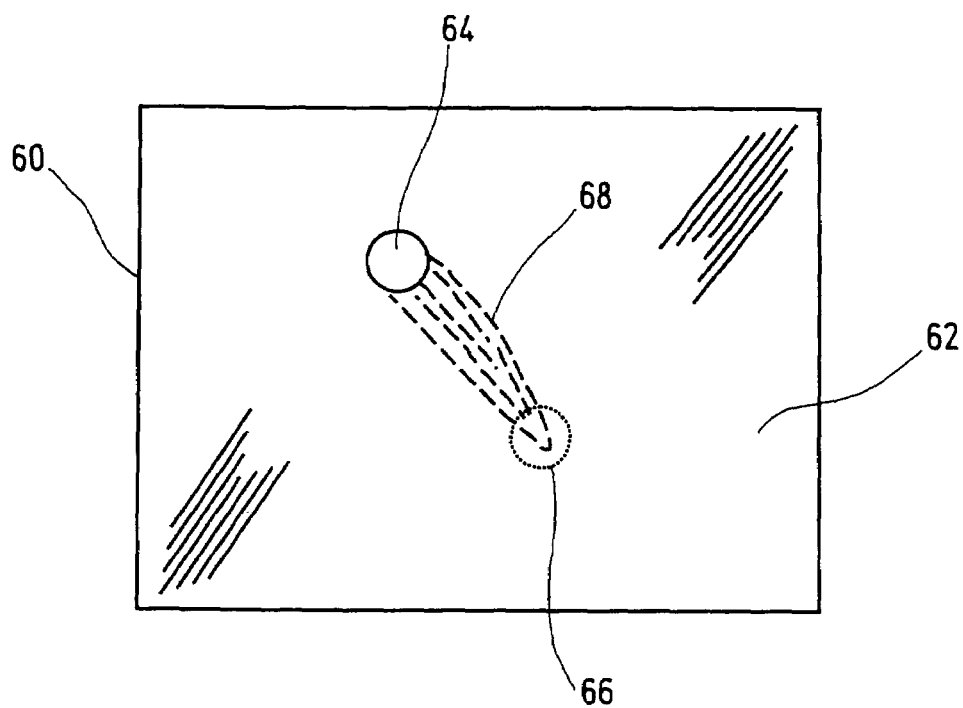
FIG. 4 shows a sketch for explaining the pulling effect.

An example of the pulling effect which can be avoided by means of the novel camera module 10 is sketched in FIG. 4. A recorded image is denoted in its entirety by reference numeral 60. The image 60 has a dark background 62 in front of which a bright object 64 is moving. Reference numeral 66 denotes the original position of the object 64. In the case of images 60 rapidly recorded in sequence, without illumination of the image sensor 12 by means of the additional, external light source 26, a comet's tail 68 would be produced as a consequence of the movement of the object 64 from the position 66. This comet's tail 68 can be reduced by means of the light source 26 to such an extent that only the bright object 64 is visible despite the movement.

This success was demonstrated, for example, by means of a pinhole diaphragm which was moved in front of a bright light source, the resulting images being recorded by means of the novel camera module 10. The hole in the pinhole diaphragm is seen in the recorded image 60 as a bright object 64, while the remaining part of the pinhole diaphragm forms the dark background 62. The success of the solution proposed here can be reproduced by means of an appropriate arrangement.

Figure 5:
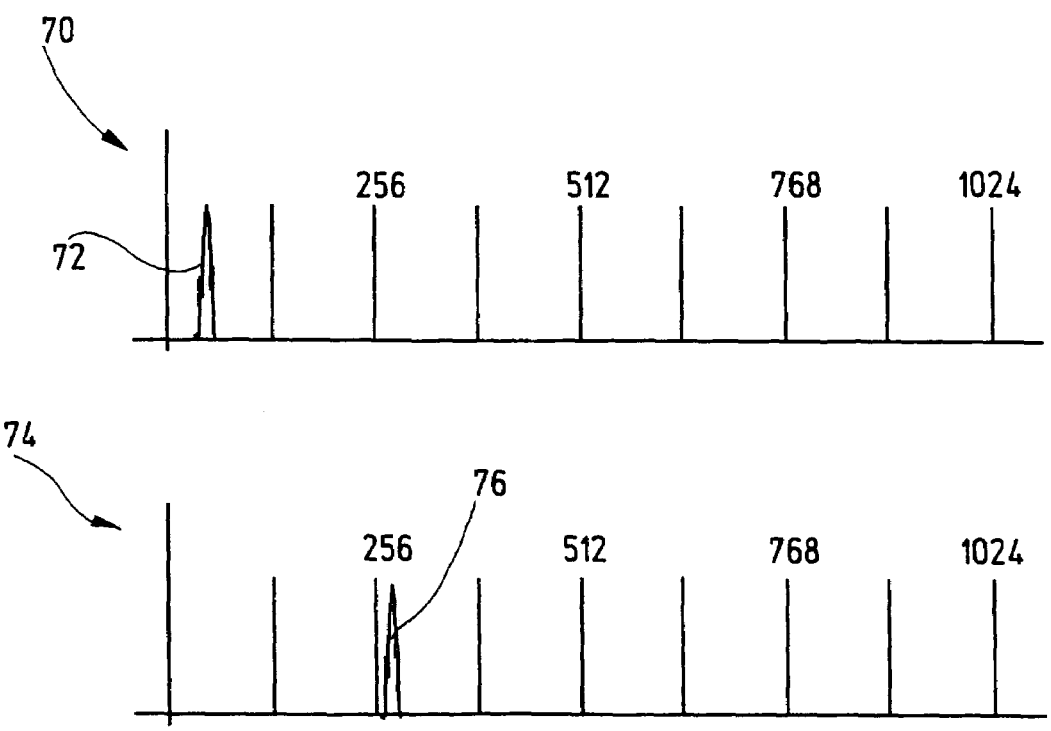
FIG. 5 shows two histograms for explaining an exemplary embodiment of the method according to the invention.

Illustrated in FIG. 5 are two histograms whose evaluation is based on a preferred exemplary embodiment. The two histograms have a scale of 0-1024, which corresponds to the 10-bit long digital data word at the output of the A/D converter. The scale value 0 corresponds to a situation in which the digital image signals supplied by the A/D converter 32 are 0, and this corresponds to absolute darkness. Similarly, the scale value 1024 corresponds to the maximum value of the A/D converter 32, and this signifies maximum brightness, these maximum values being reached seldom or never in the case of a logarithmic image cell.

A peak 72 is indicated in the upper histogram 70. Such a histogram results when the camera module 10 is used to record an image scene during darkness without further additional illumination. The peak 72 is situated in the region of the dark current of the image cell. Its width corresponds to the statistical scatter of the dark current noise, etc.

The histogram 74 shows a comparable situation, the image sensor 12 being illuminated here by means of the light source 26. The peak 76 is thereby shifted to higher values, to values around approximately 270, for example, in this instance.

The illumination of the image sensor 12 can be set individually by means of the control device 38 by forming and evaluating the histograms of image signals read out consecutively. It is possible, in particular, to drive the light source 26 in such a way that the light intensity of the image signals generated by the image sensor 12 is higher approximately by the factor 10 to 100 than without appropriate additional illumination. Driving in this way has proved to be particularly advantageous in order to suppress the pulling effects described above, without excessively impairing the dark sensitivity of the image cells.

Figure 6:
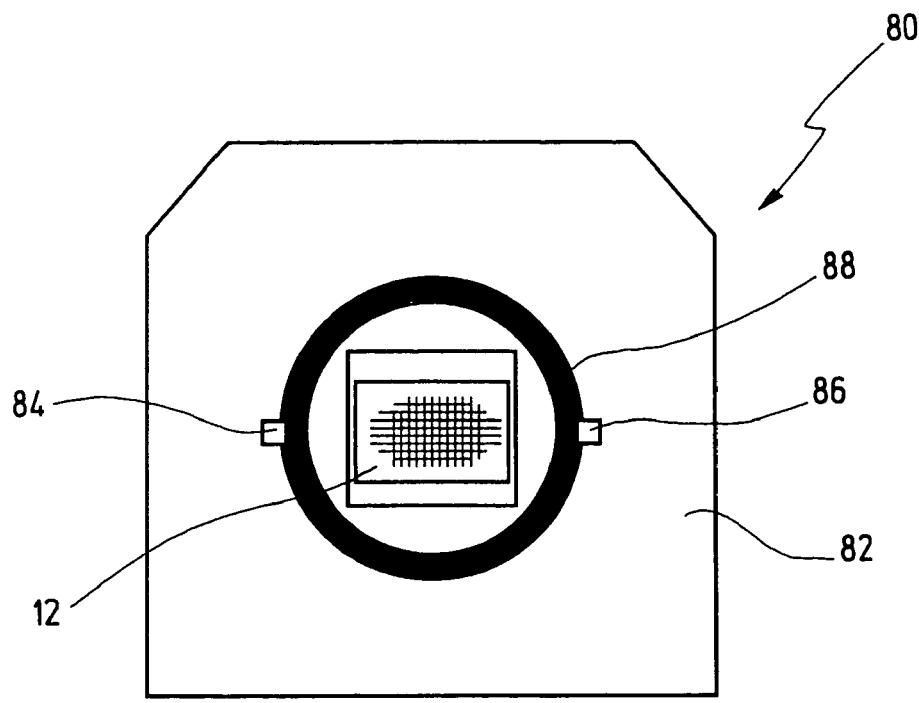
FIG. 6 shows a schematic illustration of an exemplary embodiment of the novel camera module in a top view.

A further advantageous exemplary embodiment of the novel camera module is denoted in its entirety by reference numeral 80 in FIG. 6. The camera module 80 once again has the image sensor 12, which is arranged here on a printed circuit board 82. Likewise arranged on the printed circuit board 82 are two light-emitting diodes 84, 86, which are designed here using SMD technology. Moreover, the two light-emitting diodes 84, 86 are connected to a plexiglass ring 88 which surrounds the image sensor 12 in an annular fashion. The plexiglass ring 88 acts as a semi-transmitting light distributor and leads to a particularly homogeneous implementation of the image sensor 12.

Figure 7:
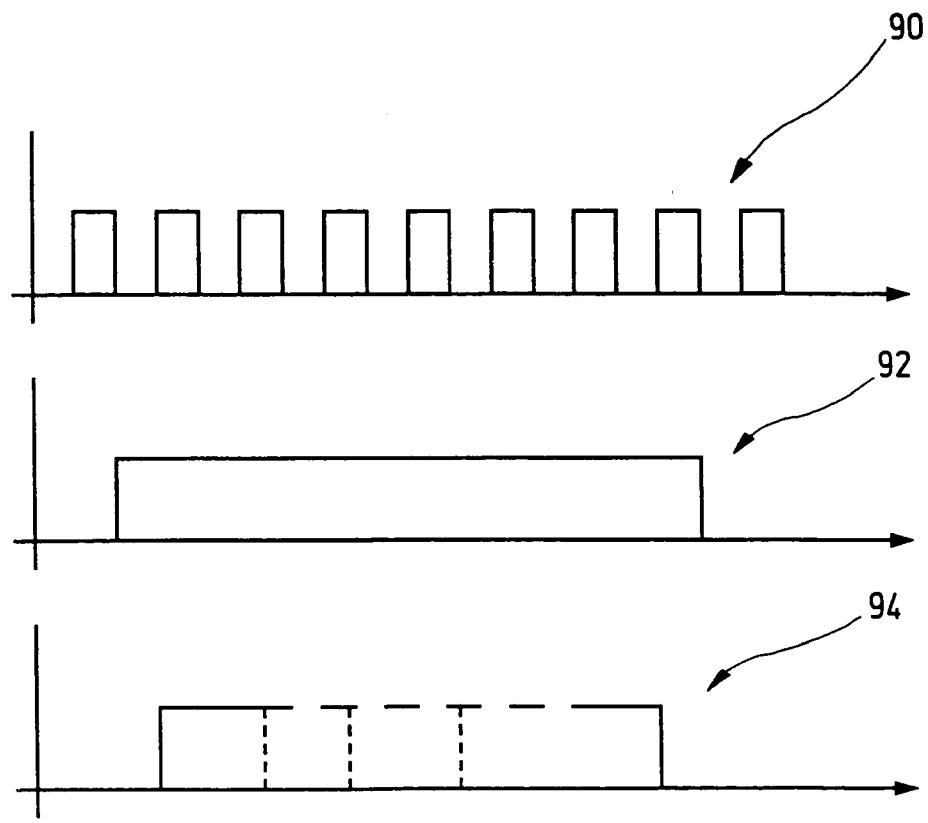
FIG. 7 shows pulse diagrams for explaining a further exemplary embodiment of the method according to the invention.

FIG. 7 shows some pulse diagrams relating to the driving of the image sensor 12. A first pulse train 90 exhibits the so-called pixel clock, i.e. a clock signal by means of which the image signals of the individual image cells 14 are transmitted sequentially to the A/D converter 32. By comparison therewith, a second pulse train 92 exhibits a control signal which is denoted as line enable in the specialist terminology (here in negative logic). Alternatively, another control signal could be involved here known as frame enable. These control signals are active when the image signals of a line of the image sensor 12 are read out (line enable) or while the image signals of all the image cells 14 are read out (frame enable).

A third pulse train 94 shows the temporal relationship with which the light source 26 is driven. In accordance with a preferred exemplary embodiment, this is performed in a pulsewise fashion, preferably in specific terms whenever it is detected by means of the second pulse train 92 that no image signals are actually being read out. In other words, the light source 26 is activated here only when the image sensor 12 is not actually supplying image signals. This prevents the light source 26 from influencing the image read out.

In accordance with a further preferred exemplary embodiment, the light source 26 is driven with a variable pulse length, and this is indicated by the dashed line in the case of the pulse train 94. This corresponds to the exemplary embodiment already described further above, in accordance with which the light source 26 is driven, for example, as a function of the histogram values of the image signals. Moreover, the brightness of the light source 26 can be controlled or regulated, and this is indicated by the potentiometer 28.

Furthermore, the control device 38 can also ascertain, by evaluating the image signals, whether severe differences in brightness occur in the case of two or more consecutive images. In accordance with a further preferred exemplary embodiment, the light source 26 is activated only when differences in brightness occur above a certain threshold. In other words, the light source 26 is therefore not activated when the brightness values change only slightly between two or more consecutive images. There is no risk of visible pulling effects in this case, and so the light source 26 is then not required.

What is claimed is:

1. A camera module for electronically recording images, the module comprising:
    an image sensor having a plurality of image cells,
    wherein each image cell is adapted to provide an electric image signal as a function of incident light, and
    each image cell having a light-sensitive element for generating a light-dependent current, and
    at least one MOS transistor having a gate terminal and a source-drain path, said MOS transistor being arranged in series with the light-sensitive element,
    the gate of the transistor being at a fixed potential and the source-drain path being flowed through by the light-dependent current,
    said module further comprising at least one light source arranged in a vicinity of the image sensor, said light source being adapted to illuminate the image cells without directly illuminating a scene to be recorded, wherein the at least one light source is configured to illuminate the light-sensitive elements whenever a predefined basic brightness exceeds a first threshold value.

2. The camera module of claim 1, wherein the light source is adapted to provide a radiation in an invisible spectral region.

3. The camera module of claim 1, wherein the light source is adapted to provide an infrared radiation.

4. The camera module of claim 1, wherein the light source is adapted to provide a radiation in the region of a wavelength of about 880 nm.

5. The camera module of claim 1, wherein the light source is integrated into the camera module in a stationary fashion.

6. The camera module of claim 1, further comprising a common printed circuit board common assembly carrier wherein the image sensor and the light source are arranged on.

7. The camera module of claim 1, further comprising a timing element adapted to activate the light source for a predefined period of time as a function of the image signals.

8. The camera module claim 1, further comprising a control device adapted to control the light source such that the image signals represent a mean light intensity which is higher than compared without the light source by a factor of approximately 5 to 200.

9. The camera module claim 8, wherein the factor is between approximately 10 and 100.

10. A camera module for electronically recording images, comprising an image sensor with a plurality of image cells, with each image cell having a light-sensitive element for generating a light-dependent current as a function of incident light, said module further comprising at least one light source arranged in the region of the image sensor, the light source being configured to illuminate the image cells, wherein the light-sensitive elements are illuminated without directly illuminating a scene to be recorded whenever a predefined basic brightness exceeds a first threshold value.

11. The camera module of claim 10, wherein the light source is adapted to illuminate the image cells with a non-visible radiation having a wavelength of about 880 nm.

12. The camera module of claim 10, wherein the light source is integrated into the camera module in a stationary fashion.

13. The camera module of claim 10, further comprising a timing element adapted to activate the light source for fixed periods of time as a function of the image signals.

14. The camera module of claim 10, further comprising a controller adapted to control illumination from the light source such that the image signals of the individual image cells represent a mean light intensity which is higher by a factor of approximately 5 to 200 than without illumination.

15. A camera module for electronically recording images, the module comprising:
an image sensor having a plurality of image cells,
wherein each image cell is adapted to provide an electric image signal as a function of incident light, and
each image cell having a light-sensitive element for generating a light-dependent current, and
at least one MOS transistor having a gate terminal and a source-drain path, said MOS transistor being arranged in series with the light-sensitive element,
the gate of the transistor being at a fixed potential and the source-drain path being flowed through by the light-dependent current,
said module further comprising at least one light source arranged in a vicinity of the image sensor, said light source being adapted to illuminate the image cells without directly illuminating a scene to be recorded,
wherein the light source is designed in the shape of a ring surrounding the image sensor.

16. A method of electronically recording images by means of an image sensor which has a plurality of image cells, the method comprising the following steps:
generating a light-dependent current by means of a light-sensitive element in each of the image cells,
generating an electric image signal in each of the image cells by means of an MOS transistor having a gate terminal and a source-drain path, wherein the transistor is arranged in series with the light-sensitive element, and wherein the gate terminal is at a fixed potential and the source-drain path is flowed through by the light-dependent current, and
reading out the electric image signals of all the image cells,
wherein the light-sensitive elements of the image cells are illuminated without directly illuminating a scene to be recorded by means of a light source arranged in the vicinity of the image cells,
wherein the light-sensitive elements are illuminated whenever a predefined basic brightness exceeds a first threshold value.

17. The method of claim 16, wherein the electric image signals are read out during first time intervals which are separated from one another, and wherein the light-sensitive elements are illuminated during second time intervals separated from one another, the first and second time intervals being different from one another.

18. A method of electronically recording images by means of an image sensor which has a plurality of image cells, the method comprising the following steps:
generating a light-dependent current by means of a light-sensitive element in each of the image cells,
generating an electric image signal in each of the image cells by means of an MOS transistor having a gate terminal and a source-drain path, wherein the transistor is arranged in series with the light-sensitive element, and wherein the gate terminal is at a fixed potential and the source-drain path is flowed through by the light-dependent current, and
reading out the electric image signals of all the image cells,
wherein the light-sensitive elements of the image cells are illuminated without directly illuminating a scene to be recorded by means of a light source arranged in the vicinity of the image cells,
wherein the light-sensitive elements are illuminated only when the brightness of image signals read-out during consecutive time intervals differs by more than a first threshold value.

* * * * *